US009753615B1

United States Patent
Zhang et al.

(10) Patent No.: US 9,753,615 B1
(45) Date of Patent: Sep. 5, 2017

(54) INTERACTIVE HEAT MAP FOR GRAPHICAL MODEL PERFORMANCE VIEW

(71) Applicant: The MathWorks, Inc., Natick, MA (US)

(72) Inventors: Fu Zhang, Sherborn, MA (US); Robert O. Aberg, South Grafton, MA (US); Joan Wortman, Cambridge, MA (US); Murali K. Yeddanapudi, Lexington, MA (US)

(73) Assignee: The MathWorks, Inc., Natick, MA (US)

( * ) Notice: Subject to any disclaimer, the term of this patent is extended or adjusted under 35 U.S.C. 154(b) by 160 days.

(21) Appl. No.: 14/185,457

(22) Filed: Feb. 20, 2014

(51) Int. Cl.
G06F 3/048 (2013.01)
G06F 3/0484 (2013.01)
G06F 17/50 (2006.01)

(52) U.S. Cl.
CPC ........ *G06F 3/0484* (2013.01); *G06F 17/5009* (2013.01)

(58) Field of Classification Search
CPC ............... G06F 3/0486; G06F 3/04847; G06F 17/30882
See application file for complete search history.

(56) References Cited

U.S. PATENT DOCUMENTS

| 8,346,921 | B1* | 1/2013 | Goodspeed et al. | G06Q 30/02 709/200 |
| 8,487,959 | B1* | 7/2013 | Khan | G06F 3/013 345/619 |
| 2007/0027701 | A1* | 2/2007 | Cohn | G06Q 10/0637 705/7.36 |
| 2008/0177622 | A1* | 7/2008 | Akkiraju | G06Q 10/06 705/7.36 |
| 2008/0180437 | A1* | 7/2008 | Clark | G06F 11/3664 345/420 |
| 2010/0082387 | A1* | 4/2010 | Cao | G06Q 10/0639 705/7.38 |
| 2014/0215487 | A1* | 7/2014 | Cherkasova | G06F 9/5083 718/106 |

OTHER PUBLICATIONS

MathWorks, "Capture Performance Data", http://www.mathworks.com/help/simulink/ug/capturing-performance-data.html, Aug. 11, 2012, 3 pages.

* cited by examiner

*Primary Examiner* — Anil N Kumar
(74) *Attorney, Agent, or Firm* — Harrity & Harrity, LLP

(57) ABSTRACT

A device may receive information identifying a model including information associated with elements included in the model. The device may cause the model to be executed, and may collect data associated with executing the model. The device may determine performance information based on the collected data. The performance information may be associated with the elements included in the model. The device may generate a heat map based on the performance information. The heat map may associate an element, of the elements, with a visual representation indicating performance information, associated with the element, based on a heat map scale. The heat map scale may relate the performance information, associated with the element, to performance information associated with another element. The heat map may be a graphical interface that includes a graphical representation of the element and a graphical representation of the other element. The device may provide the heat map.

23 Claims, 14 Drawing Sheets

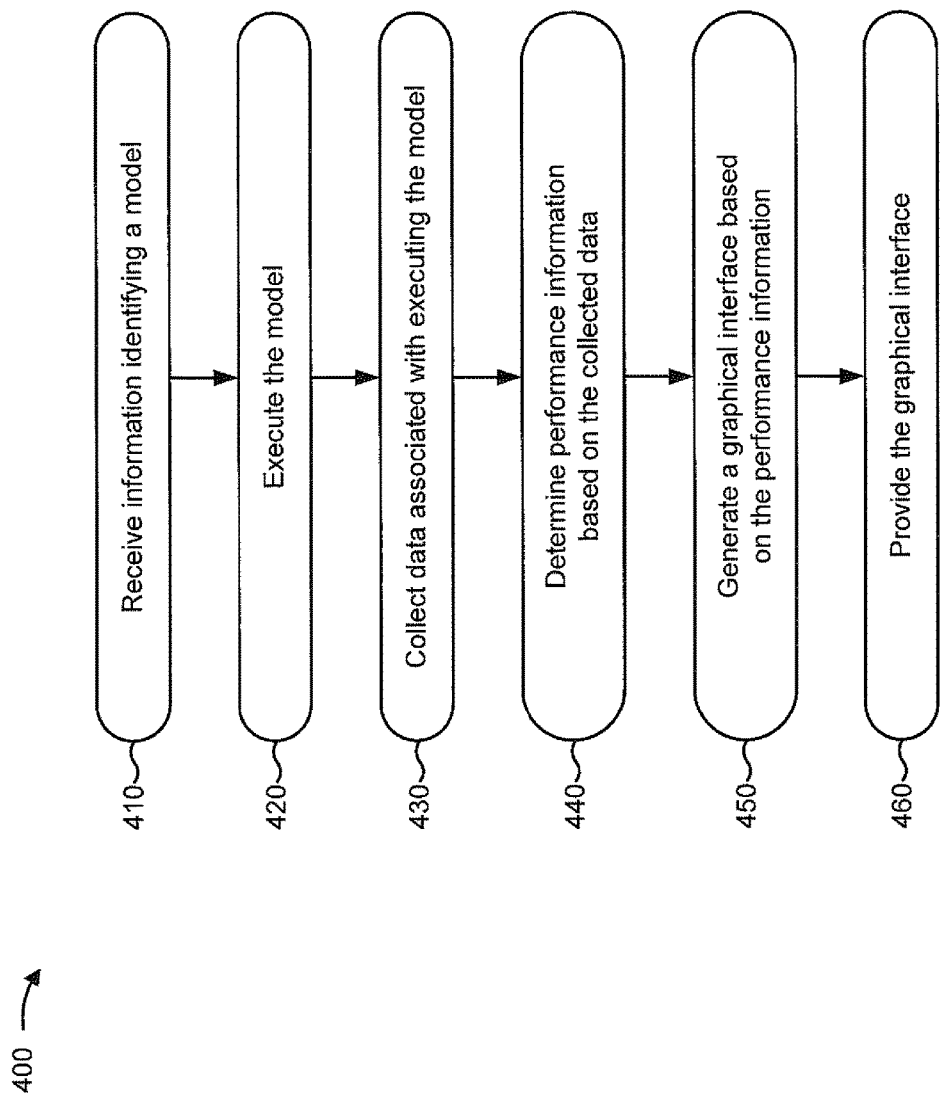

| Model 1 Execution Time Performance Information | | |
|---|---|---|
| Block Name | Time (s) | % Time |
| Block 1 | 0.48 | 4.54 |
| Block 2 | 0.37 | 3.50 |
| Block 3 | 5.42 | 51.23 |
| Block 4 | 1.64 | 15.50 |
| Block 5 | 2.48 | 23.44 |
| Block 6 | 0.10 | 0.95 |
| Block 7 | 0.09 | 0.85 |
| TOTAL | 10.58 | 100.00 |

FIG. 5B

INTERACTIVE HEAT MAP FOR GRAPHICAL MODEL PERFORMANCE VIEW

BRIEF DESCRIPTION OF THE DRAWINGS

FIG. 4 is a flow chart of an example process for displaying a graphical interface based on performance information associated with executing a model;

FIGS. 5A-5D are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A model may include a set of model elements that, when executed on a computing device, simulates behavior of a system, such as a dynamic system (e.g., an airplane wing/aileron system, a machine, etc.); a natural system (e.g., a human organ, a plant, etc.), a physical system (e.g., a bouncing ball, etc.), or the like. The system may include a set of physical elements that correspond to portions and/or components of the system. The model elements may correspond to physical elements and may, when executed, simulate the behavior of the physical elements and/or the system. The description below is described in the context of a dynamic system for explanatory purposes only. Systems and/or methods, described herein, may also be applied to other types of systems.

A user may cause a computing device to execute a model that simulates a system. The computing device may collect data, associated with one or more elements included in the model, based on executing the model. The computing device may determine performance information (e.g., an execution time associated with each element, a total number of zero crossings detected during execution of the model, etc.) based on the collected data. The user may wish to view the performance information (e.g., to determine whether the model operates efficiently, to determine whether the model needs to be debugged, etc.) in a user friendly manner (e.g., a manner that makes it easy for the user to understand how the model performs). Implementations described herein may provide performance information, associated with executing a model, in the form of a graphical interface (e.g., a heat map) associated with the model.

Figure 1A:
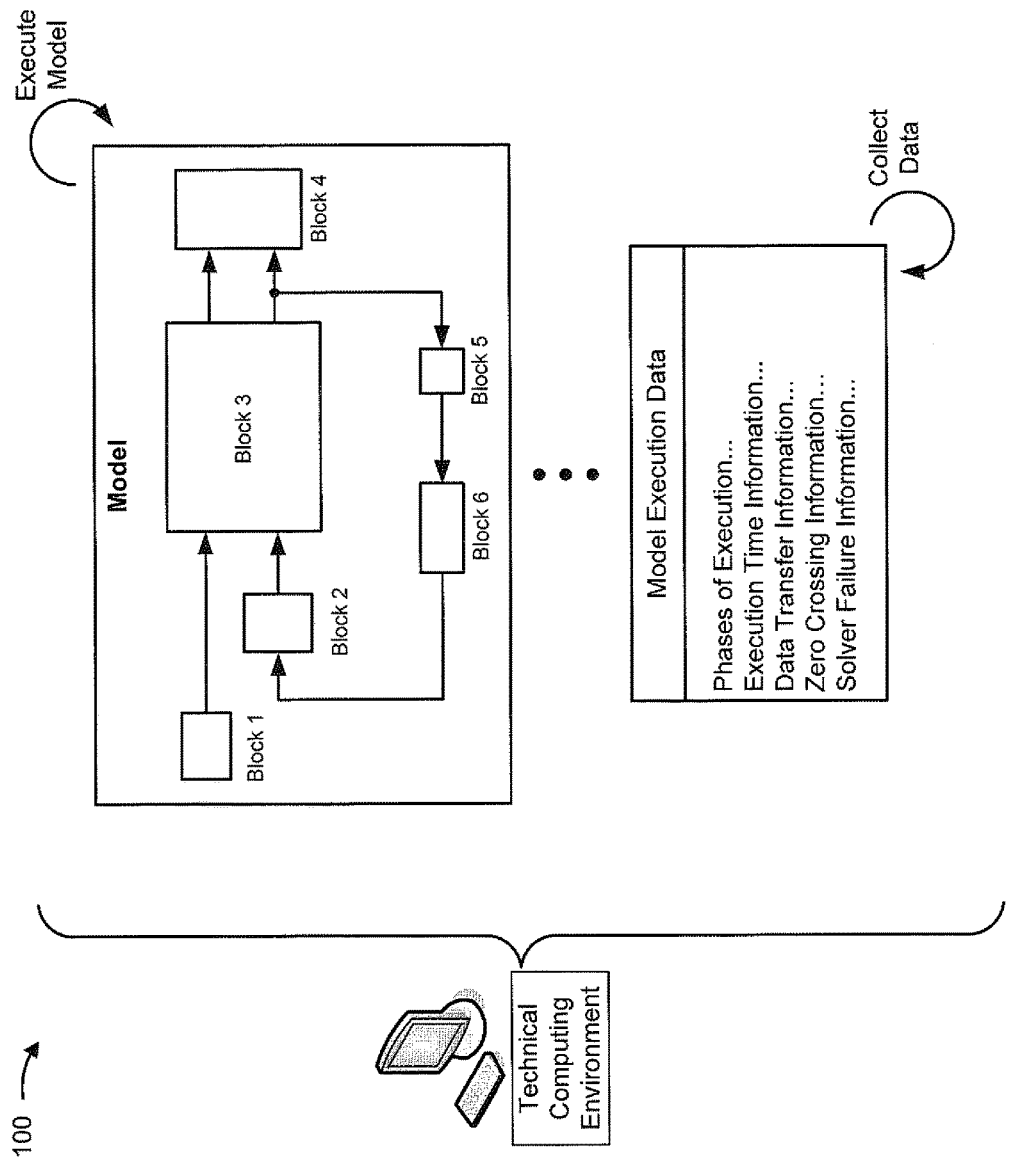
FIGS. 1A and 1B are diagrams of an overview of an example implementation described herein.
Figure 1B:
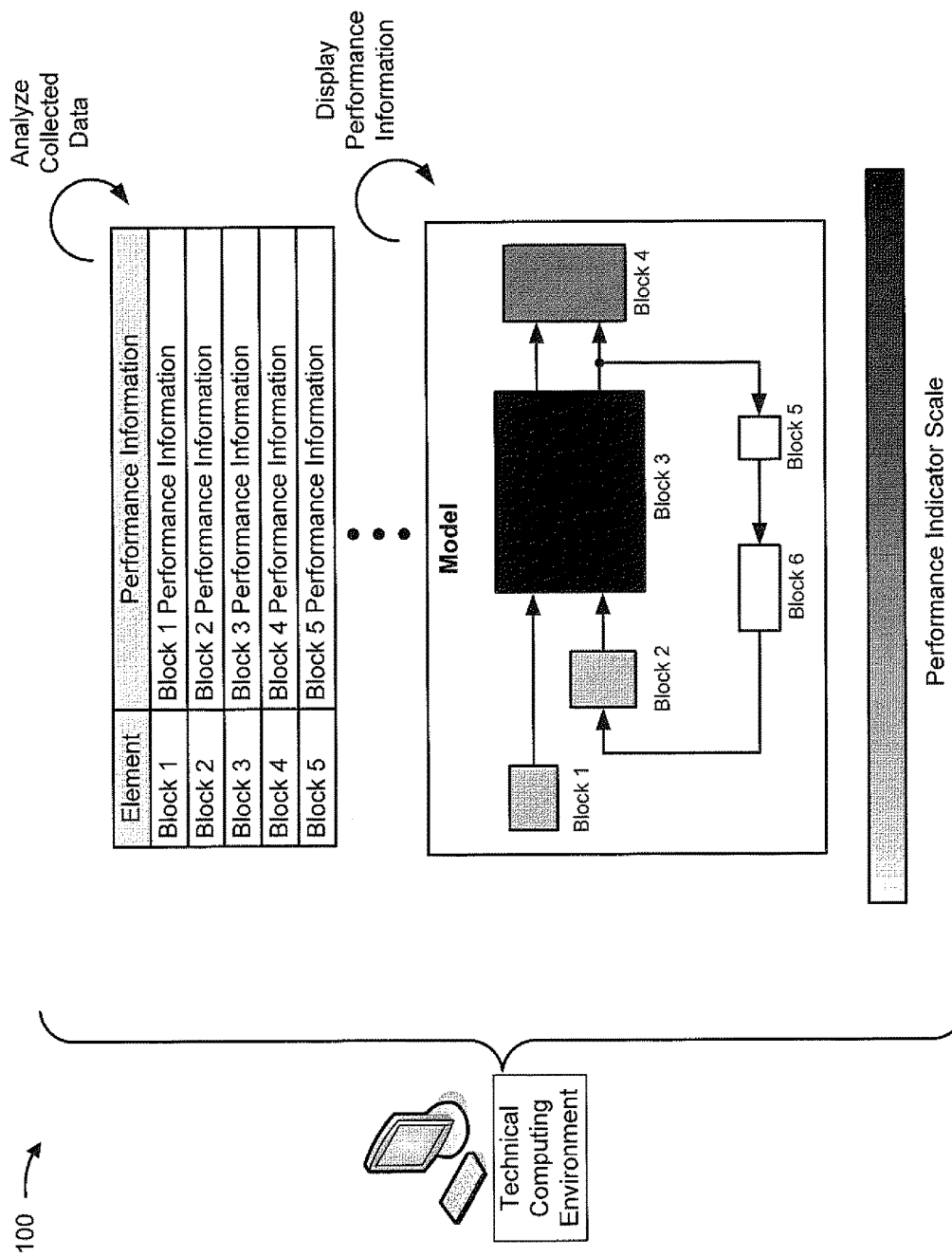

FIGS. 1A and 1B are diagrams of an overview of an example implementation 100 described herein. For the purposes of FIGS. 1A and 1B, assume that a user of a client device has created a model within a technical computing environment, and that the model includes six blocks. Further, assume that the user wishes to view a graphical interface associated with performance information (e.g., determined by the client device) when the model is executed.

As shown in FIG. 1A, the client device (e.g., the technical computing environment) may execute the model, and may collect data associated with executing the model (e.g., data associated with phases of execution, data associated with execution time, data associated with a quantity of data transferred during execution, data associated with an occurrence of an event associated with the execution of the model, such as a zero crossing, a solver failure, etc.).

As shown in FIG. 1B, the technical computing environment may analyze the collected data, and may determine performance information associated with executing the model. As shown, the technical computing environment may determine performance information associated with each block included in the model. The client device may also determine other performance information associated with the model.

As further shown in FIG. 1B, the client device may generate a graphical interface based on the performance information, and may cause the client device to display the graphical interface. As shown, the graphical interface may display a performance indication associated with each block included in the model (e.g., using one or more colors associated with a color scale). In this way, a user may view a graphical interface, associated with a model, based on performance information associated with executing the model. This may allow the user to assess the execution of the model in a user friendly manner.

Figure 2:
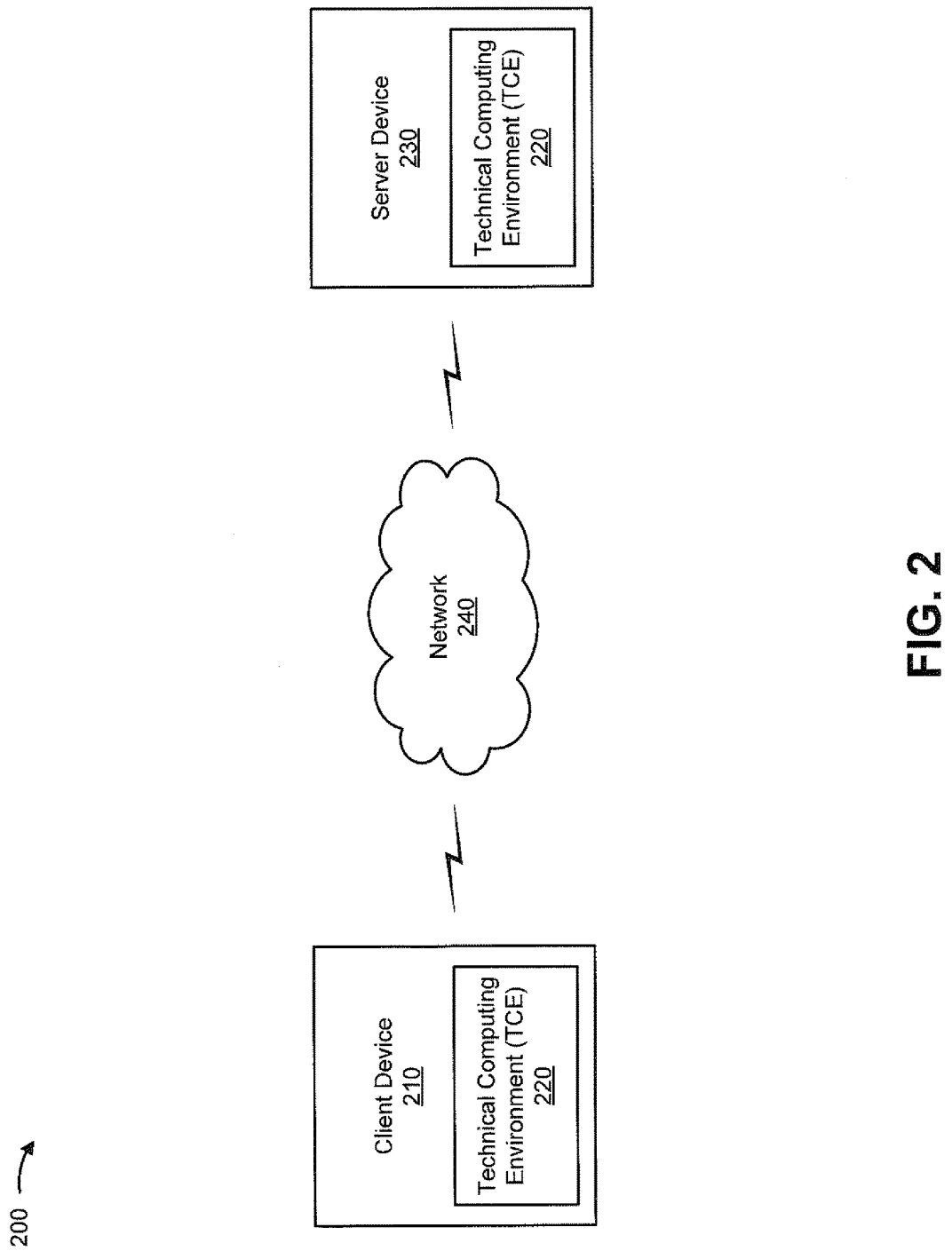
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment ("TCE") 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, processing, executing, and/or providing information associated with a model. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., information associated with a model).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; StateWORKS Studio by StateWORKS, etc.), or another type of environment, such as a hybrid environment that may include, for example, a text-based environment and a graphically-based environment.

TCE 220 may include a modeling system that may be used in the creation of a functional model and that may enable generation of executable code based on the model. For example, TCE 220 may include a graphical modeling application that provides a user interface for a computing environment. Additionally, or alternatively, TCE 220 may include a graphical modeling application that provides a user interface for modeling and/or simulating (e.g., by executing a model) a dynamic system (e.g., based on differential equations, difference equations, algebraic equations, discrete events, discrete states, stochastic relations, etc.). A dynamic system (either natural or man-made) may include a system, where a response of the system at any given time may be a function of input stimuli associated with the system, a current state associated with the system, and/or a current time.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that collectively make up the block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may include, for example, blocks connected by lines (e.g., connector lines) that can represent signal values. The blocks may include elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may include meta information, such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

Server device 230 may include one or more devices capable of receiving, generating, storing, processing, and/or providing information associated with a model. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
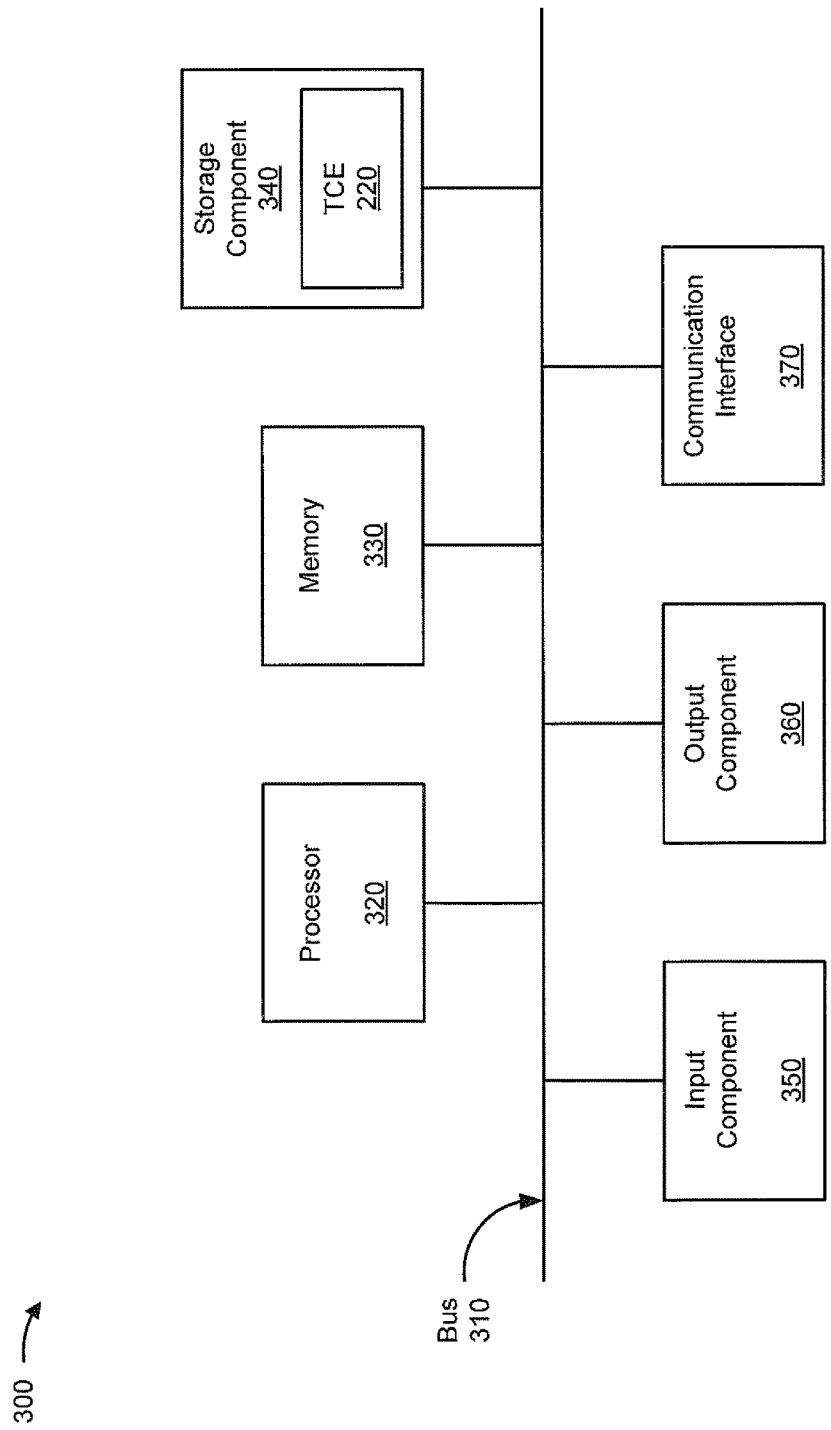
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 displaying a graphical interface based on performance information associated with executing a model. In some implementations, the process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving information identifying a model (block 410). For example, client device 210 may receive information that identifies the model from a user and/or from another device (e.g., server device 230). In some implementations, the user may interact with client device 210 (e.g., via TCE 220) to create, edit, and/or load the model. The model may include, for example, a block diagram model, a mathematical model, a flow chart, and/or program code that describes the model.

The model may include a set of elements that, when executed by client device 210 (e.g., TCE 220), simulate behavior of a system, such as a dynamic system, a natural system, a physical system, or the like. The model may generally correspond to a representation of interconnected nodes, where data dependencies, timing, ordering, and manners in which data is shared between nodes are well defined. A node may represent a computation implemented in the system (e.g., an element, of the system, that performs an operation associated with the computation), such as a computation performed on an input to generate an output.

As shown in FIG. 4, process 400 may include executing the model (block 420), and collecting data associated with executing the model (block 430). For example, client device 210 (e.g., TCE 220) may execute the model by executing program code associated with the model (e.g., program code associated with one or more elements included in the model). In some implementations, client device 210 may execute the model based on user input, received via client device 210, indicating that client device 210 is to execute the model. Additionally, or alternatively, client device 210 may execute the model based on information received from another device (e.g., server device 230).

Client device 210 may collect data, associated with executing the model, while client device 210 executes the model. For example, client device 210 may collect data associated with one or more phases of execution associated with executing the model (e.g., an update phase, a compile phase, an input phase, an output phase, a simulation phase, etc.). Additionally, or alternatively, client device 210 may collect data associated with executing one or more blocks included in the model (e.g., information associated with a time the block starts an execution, information associated with a time when the block finishes an execution, information associated with a quantity of resources used for an execution, etc.). Additionally, or alternatively, client device 210 may collect data associated with a data transfer between two or more blocks included in the model (e.g., a quantity of data associated with a data transfer, a time associated with a data transfer, etc.). Additionally, or alternatively, client device 210 may collect data associated with a solver included in the model (e.g., where the solver may be used to solve an equation included in the model), such as data associated with a zero crossing that occurs during execution of the model, data associated with a solver failure that occurs during execution of the model, or the like.

In some implementations, the data may be associated with the execution of the model in a real-world application (e.g., the data may indicate a length of time associated with the execution of the model in actual practice). Additionally, or alternatively, the data may be associated with the execution of the model by TCE 220 (e.g., the data may indicate a length of time associated with the execution of the model by TCE 220).

In some implementations, client device 210 may store the data during and/or after model execution. For example, client device 210 may store the data in a memory location (e.g., (e.g., a RAM, a hard disk, etc.) associated with client device 210. Additionally, or alternatively, client device 210 may provide the data to another device (e.g., server device 230) for storage.

As further shown in FIG. 4, process 400 may include determining performance information based on the collected data (block 440). For example, client device 210 may determine performance information based on the data collected by client device 210 (e.g., the data associated with executing the model). As an additional example, client device 210 may determine performance information, associated with the model, based on data received from another device (e.g., server device 230).

In some implementations, client device 210 may determine the performance information when client device 210 collects the data associated with executing the model (e.g., after client device 210 finishes executing the model). Additionally, or alternatively, client device 210 may determine the performance information based on user input, received by client device 210, indicating that client device 210 is to determine the performance information. Additionally, or alternatively, client device 210 may determine the performance information based on receiving, from server device 230 and/or another device, information indicating that client device 210 is to determine the performance information.

In some implementations, client device 210 may collect data associated with an execution time associated with one or more blocks included in the model, and client device 210 may determine performance information associated with the execution time associated with the one or more blocks (e.g., a total length of time associated with executing all blocks, a total length of time associated with executing each of the one or more blocks, a percentage of total time associated with executing each of the one or more blocks, etc.). Additionally, or alternatively, client device 210 may determine performance information that identifies a total quantity of executions associated with the one or more blocks (e.g., a total number of times a block was executed, a percentage of total block executions associated with a block, etc.).

Additionally, or alternatively, the performance information may include information associated with an execution time associated with the model. For example, client device 210 may collect data associated with an execution time of one or more phases of executing the model (e.g., an initiation phase, an input phase, a compile phase, an output phase, an update phase, a simulation phase, a termination phase, etc.), and client device 210 may determine performance information associated with the execution time associated with the one or more phases (e.g., a total time associated with executing all phases, a total time associated with executing each of the one or more phases, a percentage of total time associated with executing each of the one or more phases, etc.).

Additionally, or alternatively, client device 210 may collect data associated with transferring data between two or more blocks included in the model, and client device 210 may determine performance information associated with the data transfer (e.g., a total quantity of data transferred between all blocks, a total quantity of data transferred between two blocks, etc.).

Additionally, or alternatively, client device 210 may collect data associated with a solver included in the model (e.g., information associated with a zero crossing, information associated with a solver failure, etc.), and client device 210 may determine performance information associated with the solver (e.g., a total quantity of zero crossings, a total quantity of solver failures, etc.).

In some implementations, client device 210 may determine performance information based on identifying a causal relationship associated with executing the model. For example, client device 210 may determine performance information associated with the occurrence of an event (e.g., a total quantity of zero crossings) during execution of the model. Client device 210 may determine performance information associated with the event based on executing a first block included in the model (e.g., a block that detects a zero crossing), and client device 210 may determine performance information that identifies a second block (e.g., a source block) that causes the first block to execute (e.g., client device 210 may determine an upstream source of the zero crossings associated with executing the model). Similarly, client device 210 may determine performance information that identifies a third block (e.g., a diffuser block) that may be affected when the first block is executed (e.g., client device 210 may determine a downstream block affected by the zero crossings that occur during execution of the model). In other words, client device 210 may determine performance information that identifies elements of the model that cause an event (e.g., a zero crossing, a solver failure, etc.), and may determine performance information that identifies elements of the model that are affected by the event.

In some implementations, client device 210 may determine another type of performance information based on the collected data (e.g., the listed types of performance information are not exhaustive of all possible types of performance information). For example, client device 210 may determine performance information associated with a usage of global memory, a traversed sample delay, a zero crossing and algebraic loop iteration, a solver reset, usage of design stack memory, usage of logging memory, or another type of performance information.

In some implementations, client device 210 may determine the performance information based on collecting data, associated with an event, indicating that a threshold, associated with the event, is satisfied. For example, client device 210 may determine that the occurrence of an event (e.g., a total quantity of zero crossings, a total quantity of solver failures, etc.) satisfies a threshold, and may determine performance information (e.g., information indicating that the threshold is satisfied). In some implementations, the threshold may be determined based on information stored by client device 210 and/or server device 230 (e.g., a default threshold). Additionally, or alternatively, the threshold may be determined based on user input received by client device 210 (e.g., where the user may specify the threshold).

In some implementations, client device 210 may determine performance information based on user input, received via client device 210, that identifies one or more elements of the model. For example, client device 210 may receive input that identifies one or more elements included in the model (e.g., a particular element, a particular set of elements, a particular region encompassing one or more elements included in the model, etc.) and client device 210 may determine performance information associated with the one or more elements identified by the user.

As further shown in FIG. 4, process 400 may include generating a graphical interface based on the performance information (block 450). For example, client device 210 may generate a graphical interface based on the performance information determined by client device 210. In some implementations, client device 210 may generate the graphical interface when client device 210 determines the performance information. Additionally, or alternatively, client device 210 may generate the graphical interface based on receiving (e.g., via user input, via server device 230, etc.) information indicating that client device 210 is to generate the graphical interface.

In some implementations, the graphical interface may include a visual representation of the performance information. For example, the visual representation of the performance information, associated with an element included in the model, may include representing the element using a particular color (e.g., red, blue yellow, etc.), representing the element using a particular shape (e.g., a square, a circle, a triangle, a star, etc.), representing the element using a particular shape size (e.g., a large circle, a small circle, etc.), representing the element using a particular color shade (e.g., a light gray, a dark, gray, etc.), or the like.

In some implementations, client device 210 may generate the graphical interface in the form of a heat map. For example, client device 210 may generate a heat map that includes a visual representation of performance information (e.g., a first execution time), associated with a first block, using a first color (e.g., red), and includes a visual representation of performance information (e.g., a second execution time), associated with a second block, using a second color (e.g., blue). In this example, the first color may visually indicate a relationship (e.g., a difference in execution time) between the performance information, associated with the first block, and the performance information associated with the second block (e.g., where the red color indicates an execution time that is longer than an execution time associated the blue color). As an additional example, client device 210 may generate a heat map associated with one or more phases associated with executing the model (e.g., where the heat map may indicate an execution time, associated with executing a phase, relative to an execution time, associated with another phase, using one or more colors).

In some implementations, client device 210 may generate the heat map to include multiple levels of a hierarchy associated with the model. For example, the model may include one or more subsystems, and each subsystem may include one or more additional elements (e.g., a solver, an additional subsystem, etc.). Client device 210 may generate a heat map associated with each level of hierarchy (e.g., the model, the subsystem, etc.), and may allow the user of client device 210 to view the heat map associated with each level of the hierarchy (e.g., the user may click on the subsystem to view the heat map associated with the subsystem, etc.).

In some implementations, client device 210 may generate the heat map during execution of the model. For example, client device 210 may collect data, associated with a first time period (e.g., a quantity of milliseconds, a quantity of seconds, etc.) during the execution of the model, and may generate the heat map associated with first time period. Client device 210 may then collect data, associated with a second time period during the execution of the model, and may generate an updated heat map based on the data associated with second time period. As such, client device may generate the heat map at run time (e.g., the heat map may show an element changing colors as the model executes).

In some implementations, client device 210 may generate the graphical interface based on input from a user. For example, client device 210 may determine performance information associated with a portion of the model (e.g., a particular element included in the model, a particular region including two or more elements included in the model, etc.), and client device 210 may generate a graphical interface based on determining the performance information associated with that portion of the model (e.g., client device 210 may generate the graphical interface to include only the user-specified portion of the model).

In some implementations, client device 210 may generate the graphical interface based on performance information associated with a quantity of data transferred between two or more elements included in the model. For example, client device 210 may determine that a total quantity of data (e.g., a quantity of kilobytes, a quantity of bits, etc.) is transferred between two blocks included the model, and may generate a graphical interface indicating the total quantity of data transferred between the blocks (e.g., by altering the color and/or size of an element between the two blocks, such as an arrow).

In some implementations, the graphical interface may be in the form of an overlay (e.g., where client device 210 generates the graphical interface to include the model as built by the user). Additionally, or alternatively, client device 210 may superimpose the graphical interface over the model. Additionally, or alternatively, the graphical interface may be in the form of another type of display (e.g., a tree map, a hierarchy diagram, etc.).

As further shown in FIG. 4, process 400 may include providing the graphical interface (block 460). For example, client device 210 may provide the graphical interface generated by client device 210. In some implementations, client device 210 may provide the graphical interface when client device 210 generates the graphical interface. Additionally, or alternatively, client device 210 may provide the graphical interface when client device 210 receives (e.g., from user input, from server device 230, etc.) information indicating that the graphical interface is to be provided.

In some implementations, client device 210 may provide the graphical interface by causing the graphical interface to be displayed by a display screen associated with client device 210. Additionally, or alternatively, client device 210 may provide the graphical interface by causing information associated with the graphical interface (e.g., a file associated with the graphical interface) to be stored by client device 210 and/or another device, such as server device 230 (e.g., to allow the graphical interface to be viewed in the future).

In some implementations, the graphical interface may be used by the user of client device 210 to determine whether the model operates in an acceptable manner (e.g., the user may determine where the model needs to be debugged, the user may determine where the model is to be modified to increase execution speed, the user may determine a particular element that is causing an event to occur, etc.).

Additionally, or alternatively, the graphical interface may be use to parallelize execution of a model. For example, client device 210 may generate a first heat map (e.g., associated with a first region of the model that includes a first group of elements) and a second heat map (e.g., associated with a second region of the model that includes a second group of elements) based on performance information associated with a model. If the first heat map indicates that processing, associated with the first region, uses an excess amount of computing resources (e.g., as compared to the second region), then the user may determine (e.g., based on examining the first heat map and the second heat map, based on a recommendation provided by client device 210, etc.) that the processing, associated the first region, is to be performed by one or more parallel processing units that operate in parallel with a processing unit that processes information associated with the second region. In this way, the first heat map and the second heat map may be analyzed to determine a manner in which parallel processors may be configured to increase model execution speed.

In some implementations, client device 210 may generate program code based on a model after client device 210 provides the graphical interface. For example, client device 210 may provide a graphical interface, the user may (e.g., via client device 210) analyze the graphical interface, the user may modify the model based on analyzing the graphical interface, and client device 210 may generate program code based on the modified model. In this example, the generated program code may be configured to execute on a target processor, such as an embedded processor.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. For the purposes of example implementation 500, assume that a user of client device 210 wishes to view a graphical interface, in the form of a heat map, that indicates performance information associated with executing Model 1.

Figure 5A:
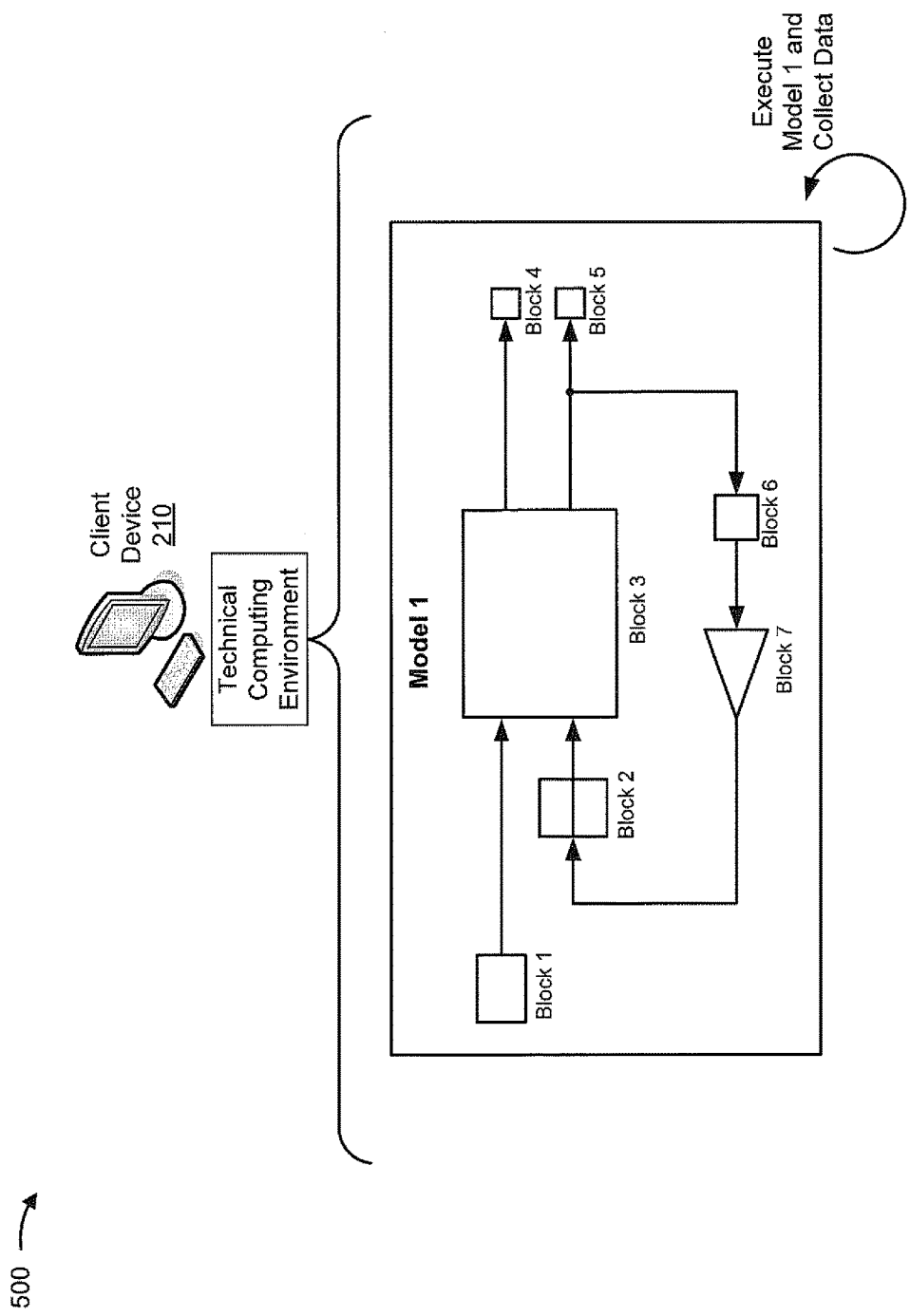

As shown in FIG. 5A, the user may load Model 1 using technical computing environment 220. As shown, Model 1 may include seven blocks (e.g., block 1 through block 7). As further shown, client device 210 may execute Model 1, and may collect data associated with executing Model 1 (e.g., client device 210 may collect data associated with one or more executions of each block included in Model 1). For example, client device 210 may collect data associated with each execution of each block, such as a length of time per execution. As an additional example, client device 210 may collect data associated with executing each of one or more phases associated with executing Model 1, such as a length of time associated with executing each phase.

As shown in FIG. 5B, client device 210 may determine performance information based on the data, associated with executing Model 1, collected by client device 210. As shown, client device 210 may determine a total execution time associated with executing Model 1 (e.g., 10.58 seconds). As further shown, client device 210 may determine a total execution time (e.g., a sum total time of all executions of block 1) associated with each block included in Model 1. As shown, client device 210 may determine that the total execution time associated with block 1 is 0.48 seconds, may determine that the total execution time associated with block 2 is 0.37 seconds, may determine that the total execution time associated with block 3 is 5.42 seconds, may determine that the total execution time associated with block 4 is 1.64 seconds, may determine that the total execution time associated with block 5 is 2.48 seconds, may determine that the total execution time associated with block 6 is 0.10 seconds, and may determine that the total execution time associated with block 7 is 0.09 seconds.

As further shown in FIG. 5B, client device 210 may determine performance information that identifies a percentage of total execution time based on the execution time associated with each block in Model 1. As shown, client device 210 may determine that 4.54% of the overall execution time is attributable to block 1 (e.g., 0.48/10.58=4.54%), may determine that 3.50% of the overall execution time is attributable to block 2 (e.g., 0.37/10.58=3.50%), may determine that 51.23% of the overall execution time is attributable to block 3 (e.g., 5.42/10.58=51.23%), may determine that 15.50% of the overall execution time is attributable to block 4 (e.g., 1.64/10.58=15.50%), may determine that 23.44% of the overall execution time is attributable to block 5 (e.g., 2.48/10.58=23.44%), may determine that 0.95% of the overall execution time is attributable to block 6 (e.g., 0.10/10.58=0.95%), and may determine that 0.85% of the overall execution time is attributable to block 7 (e.g., 0.09/10.58=0.85%).

Figure 5C:
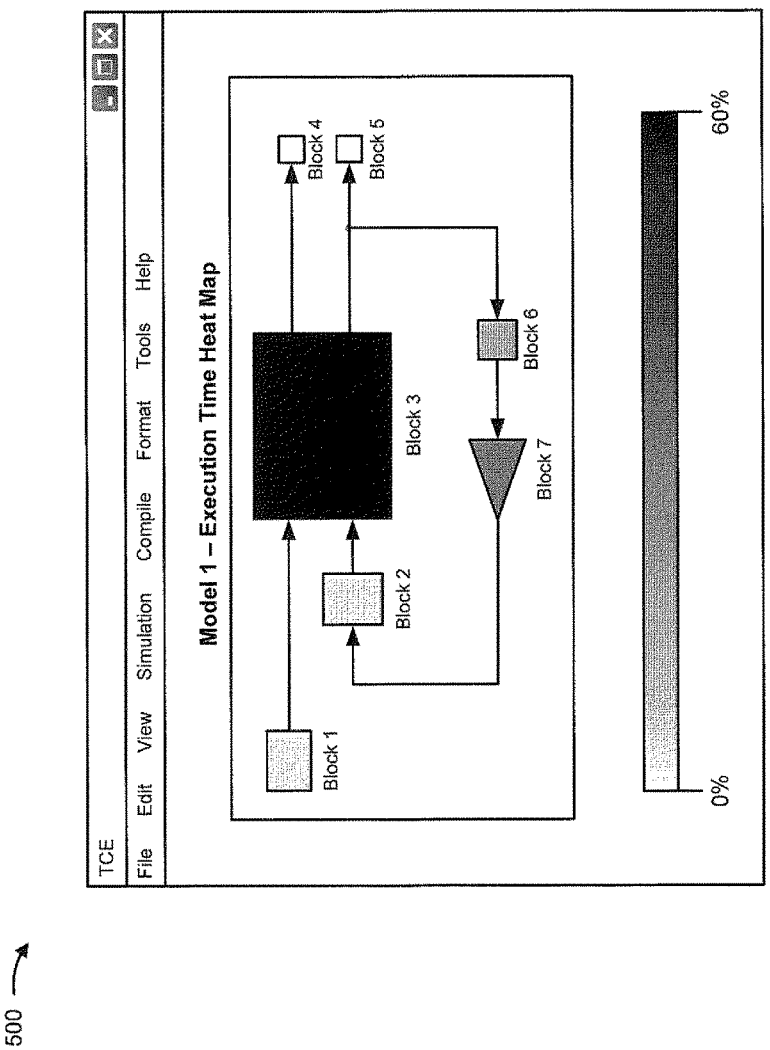

As shown in FIG. 5C, client device 210 may generate and provide a graphical interface (e.g., in the form of a heat map) associated with the percentage of total execution time, associated with each block included in Model 1, relative to a color scale (e.g., ranging from 0% to 60%). As shown, block 3 may be shaded (e.g., using a dark gray color), based on the color scale, to indicate that block 3 is responsible for 51.23% of the execution time associated with Model 1. Similarly, block 4 and block 5 may be shaded (e.g., using a white color), based on the color scale, to indicate that block 4 and block 5 are responsible for 0.95% and 0.85% of the execution time, respectively. Block 1, block 2, block 6, and block 7 may also be shaded in a similar manner (e.g., using various colors between white and black) to indicate a percentage of overall execution time associated with each block. The user can determine that block 3 is responsible for most of the execution time, and the user may choose to investigate whether block 3 is to be modified (e.g., to execute in a more efficient manner).

Figure 5D:
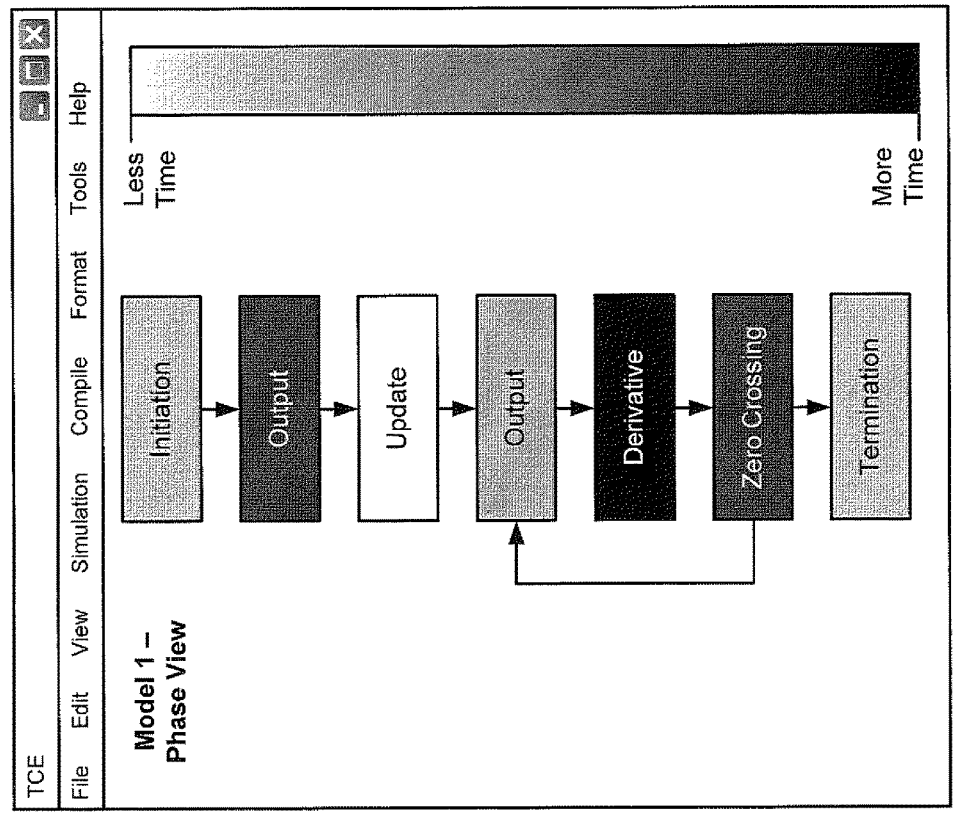

As shown in FIG. 5D, client device 210 may also generate and provide a graphical interface (e.g., in the form of a heat map) associated with each of one or more phases related to executing Model 1. For example, client device 210 may determine, based on data associated with the execution of each phase during the execution of Model 1, a total execution time associated with executing each phase and a percentage of time associated with executing each phase (e.g., in a similar manner as described above). As shown, the graphical interface may indicate that, relative to the other phases of execution, a derivative phase is responsible for the largest amount of execution time (e.g., where the display associated with the derivative phase is shaded using a black color). Similarly, the graphical interface may indicate that an update phase, associated with executing Model 1, is responsible for the smallest amount of execution time (e.g., where the display associated with the update phase is shaded using a white color). As shown, other phases (e.g., an initiation phase, a first output phase, a second output phase, a zero crossing phase, and a termination phase) may be shaded in a similar manner (e.g., using various colors between white and black) to indicate a respective amount of execution time associated with each phase. The user can determine that the derivative phase is responsible for most of the execution time, and the user may choose to investigate whether portions of the model, associated with the derivative phase, are to be modified (e.g., to execute in a more efficient manner as compared to how portions of the derivative phase initially operated).

As indicated above, FIGS. 5A-5D are provided merely as an example. Other examples are possible and may differ from what was described with regard to FIGS. 5A-5D.

Figure 6A:
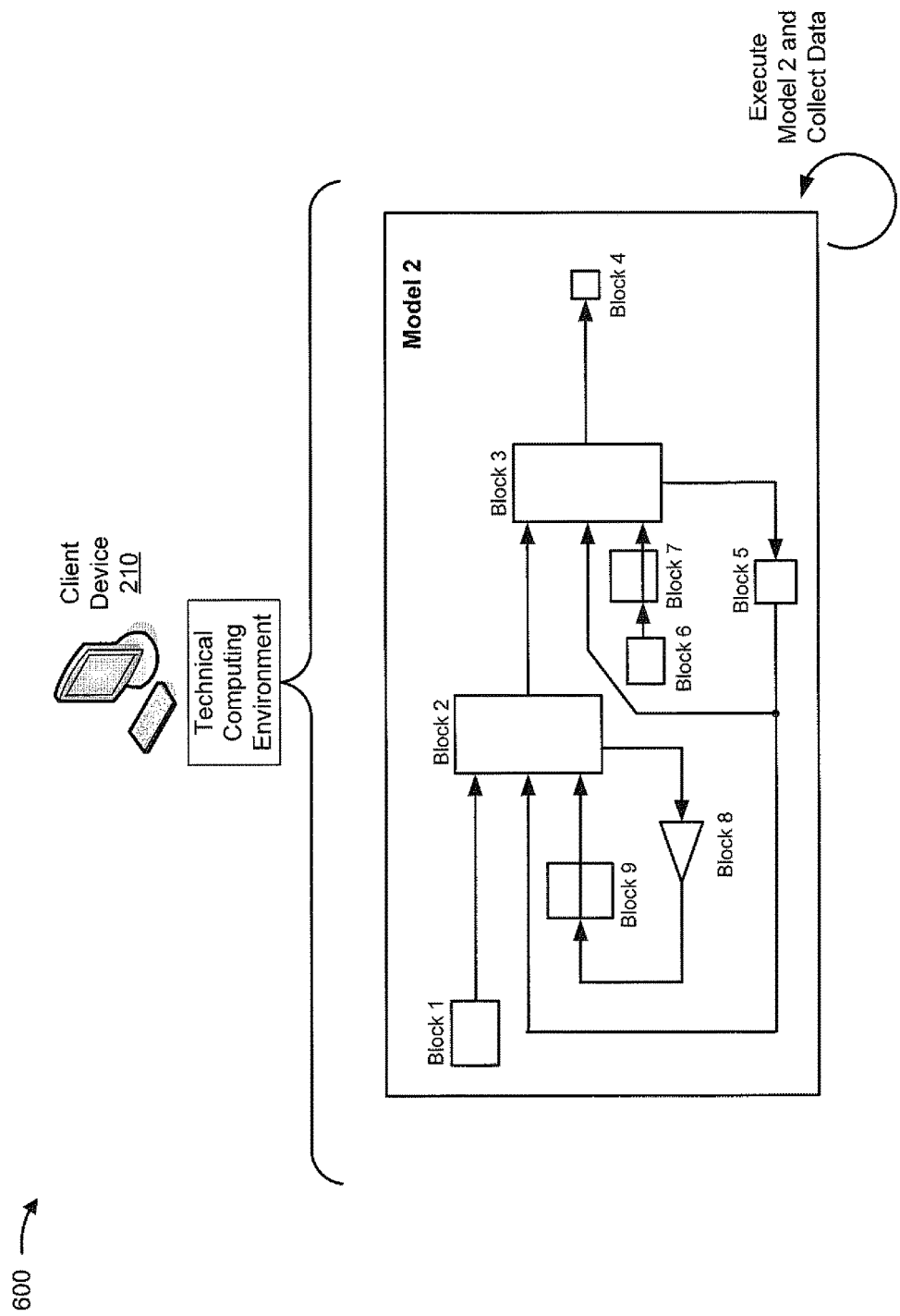
FIGS. 6A-6C are diagrams of an another example implementation relating to the example process shown in FIG. 4.
Figure 6B:
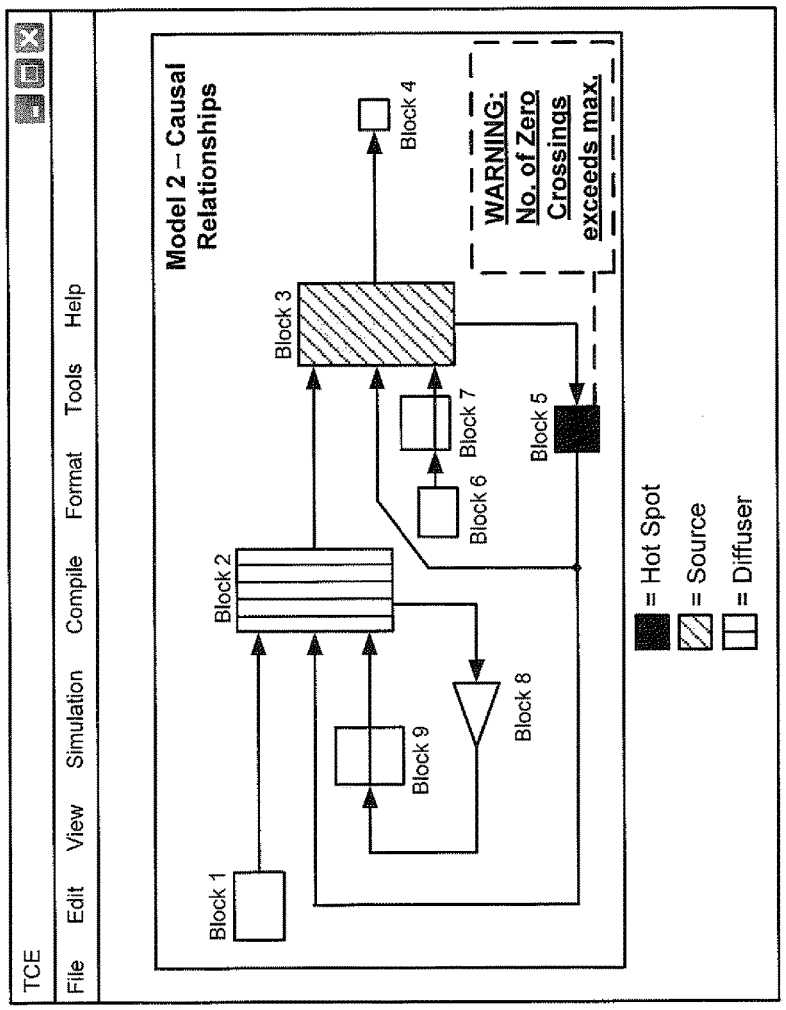
Figure 6C:
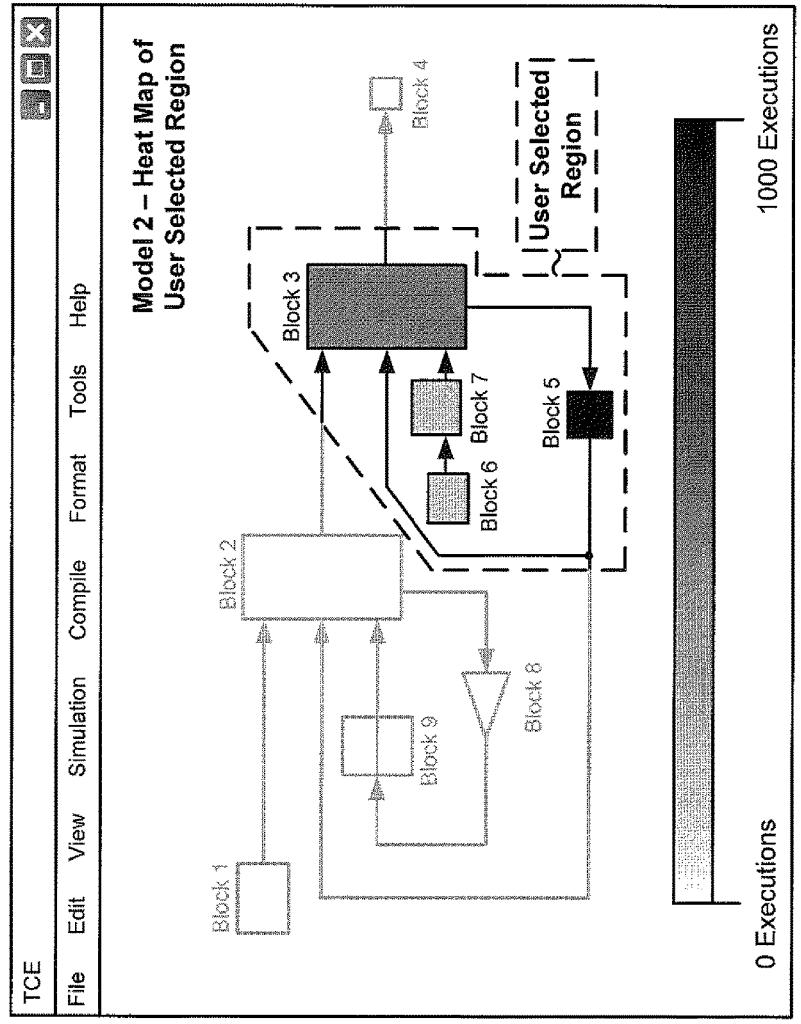

FIGS. 6A-6C are diagrams of another example implementation 600 relating to example process 400 shown in FIG. 4. For the purposes of example implementation 600, assume that a user of client device 210 wishes to view a graphical interface that indicates performance information associated with a set of blocks included in Model 2.

As shown in FIG. 6A, the user may load Model 2 using technical computing environment 220. As shown, Model 2 may include nine blocks (e.g., block 1 through block 9). As further shown, client device 210 may execute Model 2, and may collect data associated with executing Model 2 (e.g., client device 210 may collect data associated with one or more executions of each block included in Model 2). For example, client device 210 may collect data associated with multiple zero crossings that occur during the execution of Model 2, and may collect data associated with a total quantity of executions associated with each block included in Model 2.

As shown in FIG. 6B, client device 210 may generate a graphical interface that includes information that identifies a causal relationship associated with executing Model 2. As shown, client device 210 may determine that a quantity of zero crossings, detected (e.g., by block 5) during the execution of Model 2, satisfies a threshold quantity of zero crossings (e.g., a default threshold quantity). As shown, client device 210 may notify the user that the quantity of zero crossings detected satisfies the threshold (e.g., "WARNING: No. of Zero Crossings exceeds max.").

As further shown in FIG. 6B, client device 210 may determine additional performance information associated with the detected zero crossings. As shown, client device 210 may determine (e.g., based on the collected data), that block 3 is causing block 5 to detect the zero crossings, and may determine that block 2 is affected by block 5 detecting the zero crossings (e.g., where block 2 is to reset each time block 5 detects a zero crossing event). As shown, client device 210 may generate and provide a graphical interface that may indicate that block 5 is "hot spot" (e.g., a block where the threshold quantity of zero crossings are detected), may indicate that that block 3 is a "source" (e.g., an upstream block that causes of the zero crossing events), and may indicate that block 2 is a "diffuser" (e.g., a downstream block that is affected by the zero crossing events). In this way, the user may be provided with graphical information that may indicate a manner in which the model may be modified to decrease the quantity of zero crossing events (e.g., by modifying block 3).

As shown in FIG. 6C, client device 210 may generate and provide a graphical interface based on user input identifying a set of blocks included in Model 2. As shown, the user of client device 210 may select a region (e.g., by tracing the region with an input device, such as a mouse or a finger on a touch screen, associated with client device 210) that includes the set of blocks included in Model 2. As shown, client device 210 may generate (e.g., based on the collected data) and provide a graphical interface (e.g., in the form of a heat map), indicating a quantity of executions associated with each block included in the set of blocks. As shown, the graphical interface may indicate that block 5 is responsible for the most executions (e.g., by shading block 5 with a black color), and may indicate that block 6 and block 7 are responsible for the fewest amount of executions (e.g., by shading block 6 and block 7 with a light gray color). As shown, only those blocks included in the user specified region are included in the graphical interface generated and provided by client device 210.

As indicated above, FIGS. 6A-6C are provided merely as an example. Other examples are possible and may differ from what was described with regard to FIGS. 6A-6C.

Figure 7A:
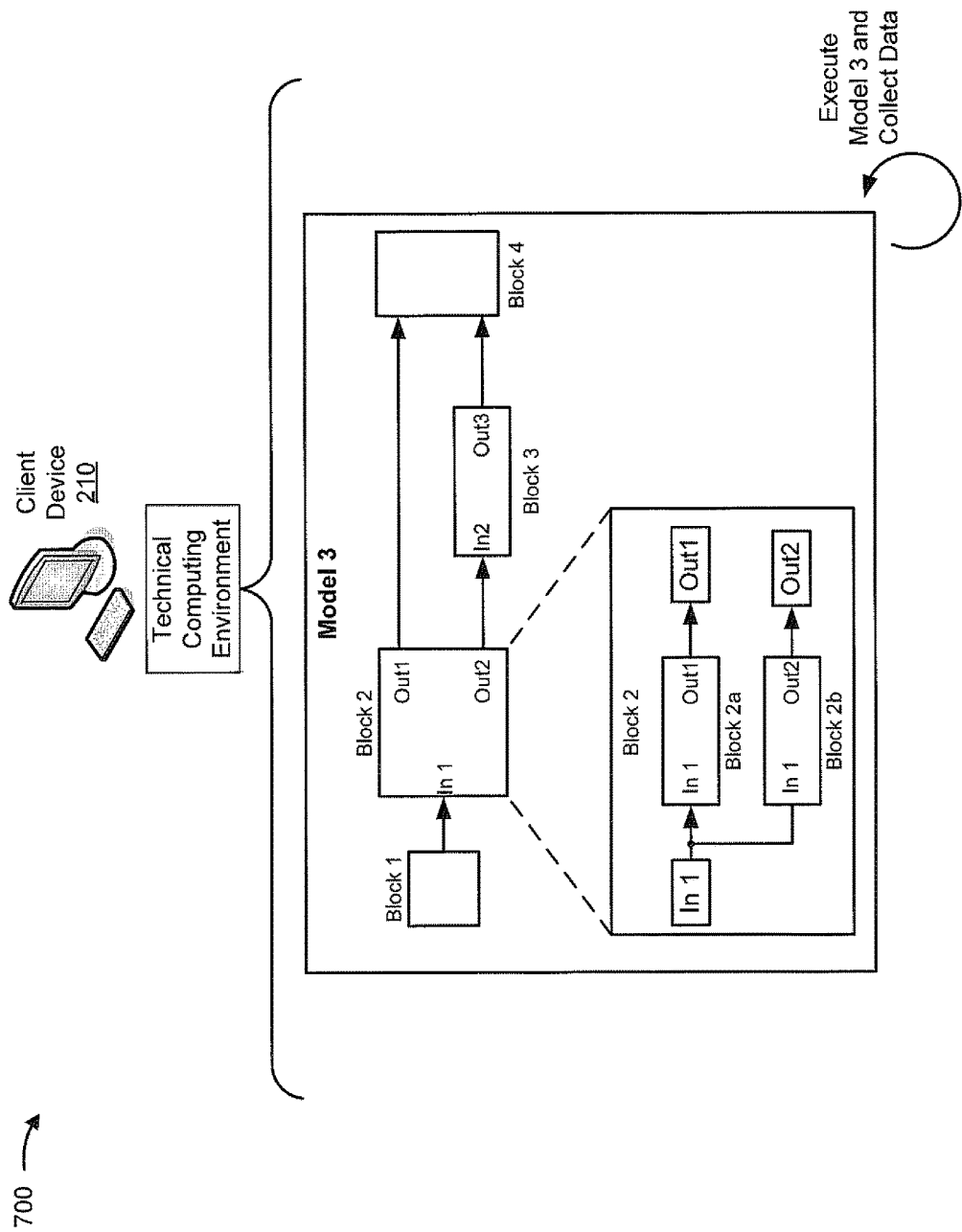
FIGS. 7A and 7B are diagrams of an additional example implementation relating to the example process shown in FIG. 4.
Figure 7B:
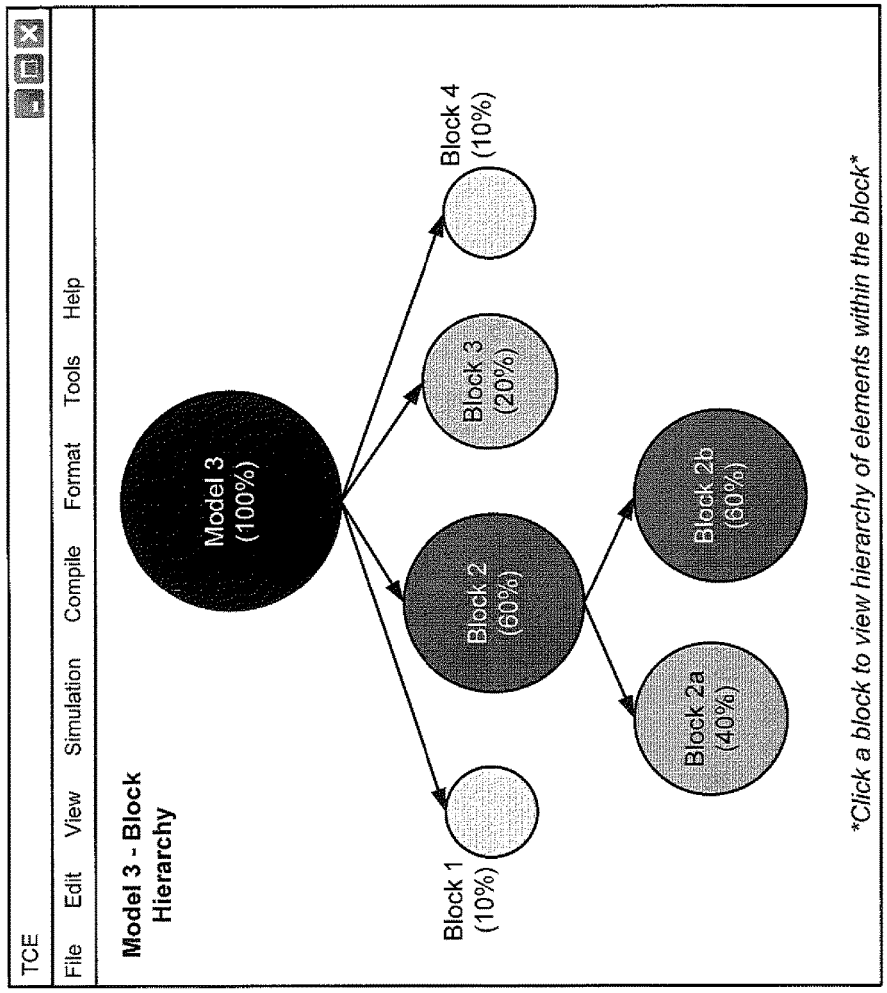

FIGS. 7A and 7B are diagrams of an additional example implementation 700 relating to example process 400 shown in FIG. 4. For the purposes of example implementation 700, assume that a user of client device 210 wishes to view a graphical interface that indicates performance information associated with a set of blocks included in Model 3.

As shown in FIG. 7A, the user may load Model 3 using technical computing environment 220. As shown, Model 3 may include six blocks (e.g., block 1, block 2, block 2a, block 2b, block 3, and block 4). As shown, block 2 may represent a subsystem that includes block 2a and 2b. As further shown, client device 210 may execute Model 3, and may collect data associated with executing Model 3. For example, client device 210 may collect data associated with each execution of each block included in Model 3, such as a length of time associated with each execution.

As shown in FIG. 7B, client device 210 may generate and provide a graphical interface in the form of a hierarchical diagram. As shown, the top layer of the hierarchy may indicate that Model 3 is responsible for the entire execution time (e.g., Model 3 (100%)), since Model 3 was the only model executed. As further shown, the middle layer of the hierarchy may indicate a percentage of time that each block (e.g., block 1, block 2, block 3, and block 4) is responsible for with regard to an overall execution time. As shown, block 1 may be responsible for 10% of the execution time associated with Model 3, block 2 may be responsible for 60% of the execution time associated with Model 3, block 3 may be responsible for 20% of the execution time associated with Model 3, and block 4 may be responsible for 10% of the execution time associated with Model 3.

As further shown, the bottom level of the hierarchy may indicate a percentage of time that each subsystem block included in block 2 (e.g., block 2a and block 2b) is responsible for with regard to the execution time associated with block 2. As shown, block 2a may be responsible for 40% of the execution time associated with block 2, and block 2b may be responsible for 60% of the execution time associated with block 2.

As further shown in FIG. 7B, client device 210 may generate and provide the hierarchical diagram using shapes of various sizes (e.g., where smaller size may indicate a lower percentage than a larger size). Similarly, as shown, client device 210 may generate and provide the hierarchical diagram using various colors (e.g., where a lighter color may indicate a lower percentage than a darker color). As further shown, the user may click on a particular block included in the hierarchical diagram to view a graphical interface associated with one or more elements included within the block.

As indicated above, FIGS. 7A and 7B are provided merely as an example. Other examples are possible and may differ from what was described with regard to FIGS. 7A and 7B.

Implementations described herein may allow a user to view performance information, associated with executing a model, in the form of a graphical interface associated with the model.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
    determine performance information based on data collected in association with execution of a block diagram model,
        the block diagram model, when executed, simulating a dynamic system,
        the block diagram model including a plurality of model elements that, when executed, simulate behavior of corresponding physical elements of the dynamic system,
        the performance information being associated with the plurality of model elements included in the block diagram model,
        the performance information including one or more of:
            a total quantity of executions associated with each of the plurality of model elements,
            information associated with transferring data between two or more of the plurality of model elements, or
            information determined based on identifying a causal relationship associated with executing the block diagram model;
    determine particular performance information, of the performance information, that identifies execution information associated with a particular model element of the plurality of model elements included in the block diagram model; and
    generate a heat map based on the particular performance information,
        the one or more processors, when generating the heat map, are to:
            associate the particular model element, of the plurality of model elements, with a visual representation indicating the particular performance information, based on a heat map scale,
                the heat map scale relating the particular performance information to performance information associated with another model element of the plurality of model elements, and
            represent the heat map in a graphical form that includes a graphical representation of the particular model element and a graphical representation of the other model element.

2. The device of claim 1, where the heat map includes visual information reflecting the execution information associated with the particular model element.

3. The device of claim 1, where the one or more processors are further to:
    determine performance information that identifies a quantity of data transferred between at least two model elements, of the plurality of model elements, associated with the block diagram model, the data being transferred during the execution of the block diagram model; and
generate the heat map based on the performance information that identifies the quantity of data transferred between the at least two model elements.

4. The device of claim 1, where the one or more processors are further to:
determine performance information that identifies an occurrence of an event associated with executing the block diagram model; and
generate the heat map based on the performance information that identifies the occurrence of the event associated with executing the block diagram model.

5. The device of claim 1, where the one or more processors are further to:
receive information that identifies a user selected region that includes a set of model elements of the plurality of model elements,
the set of model elements including at least one of the plurality of model elements included in the block diagram model; and
generate the heat map based on the information that identifies the user selected region.

6. The device of claim 1, where the heat map is:
a first heat map associated with the plurality of model elements included in the block diagram model; and
where the one or more processors are further to:
receive user input, associated with the first heat map, identifying a model element, of the plurality of model elements, included in the first heat map;
determine performance information associated with the model element;
generate, based on the performance information associated with the model element, a second heat map,
the second heat map associating the model element with a visual representation indicating the performance information associated with the model element based on the heat map scale; and
provide the second heat map.

7. The device of claim 1, where the performance information is associated with at least one of:
an amount of global memory usage;
a traversed sample delay;
a zero crossing;
an algebraic loop iteration;
a solver reset;
an amount of design stack memory usage; or
an amount of logging memory usage.

8. A non-transitory computer-readable medium storing instructions, the instructions comprising:
one or more instructions that, when executed by one or more processors, cause the one or more processors to:
receive data based on executing a block diagram model,
the block diagram model, when executed, simulating a dynamic system,
the block diagram model including a plurality of model elements that, when executed, simulate behavior of corresponding physical elements of the dynamic system,
the data relating to at least one of:
a total quantity of executions associated with each of the plurality of model elements;
information associated with transferring data between two or more of the plurality of model elements included in the block diagram model; or information determined based on identifying a causal relationship associated with executing the block diagram model;
determine performance information that identifies execution information associated with the plurality of model elements included in the block diagram model,
the performance information being based on the data;
generate a graphical interface based on the performance information,
the graphical interface including a visual representation indicating the performance information,
the visual representation identifying at least a portion of the execution information, associated with the plurality of model elements, using indicators based on a color scale associated with the performance information,
the indicators including different colors or different shades of colors based on the color scale, and
the graphical interface relating to the plurality of model elements included in the block diagram model; and
provide the graphical interface.

9. The non-transitory computer-readable medium of claim 8, where the one or more instructions, when executed by the one or more processors, further cause the one or more processors to:
determine particular performance information that identifies particular execution information associated with a particular model element of the plurality of model elements included the block diagram model; and
generate the graphical interface based on the particular performance information that identifies the particular execution information associated with the particular model element,
the graphical interface including a visual representation indicating the performance information that identifies the particular execution information.

10. The non-transitory computer-readable medium of claim 8, where the one or more instructions, when executed by the one or more processors, further cause the one or more processors to:
determine performance information associated with the transferring the data between the two or more of the plurality of model elements included in the block diagram model,
the transferring the data occurring during the execution of the block diagram model; and
generate the graphical interface based on the performance information associated with the transferring the data between the two or more of the plurality of model elements,
the graphical interface including a visual representation of the transferring the data between the two or more of the plurality of model elements.

11. The non-transitory computer-readable medium of claim 8, where the one or more instructions, when executed by the one or more processors, further cause the one or more processors to:
determine performance information that identifies an occurrence of an event associated with executing the block diagram model; and
generate the graphical interface based on the performance information that identifies the occurrence of the event associated with executing the block diagram model, the graphical interface including a visual representation of the occurrence of the event associated with executing the block diagram model.

12. The non-transitory computer-readable medium of claim 8, where the one or more instructions, when executed by the one or more processors, further cause the one or more processors to:
   receive information that identifies a user selected region that includes a set of model elements of the plurality of model elements; and
   generate the graphical interface for the set of model elements included in the user selected region.

13. The non-transitory computer-readable medium of claim 8, where the graphical interface is:
   a first graphical interface associated with the plurality of model elements included in the block diagram model; and
   where the one or more instructions, when executed by the one or more processors, further cause the one or more processors to:
      receive user input, associated with the first graphical interface;
      identify a model element included in the first graphical interface based on the user input;
      determine performance information associated with the model element;
      generate, based on the performance information associated with the model element, a second graphical interface,
         the second graphical interface associating the model element with a visual representation of the performance information associated with the model element; and
      provide the second graphical interface.

14. The non-transitory computer-readable medium of claim 8, where the graphical interface includes at least one of:
   an overlay associated with the block diagram model;
   a hierarchical diagram associated with the block diagram model; or
   a tree map associated with the block diagram model.

15. A method, comprising:
   obtaining data based on executing a block diagram model,
      the block diagram model, when executed, simulating a dynamic system,
      the block diagram model including a plurality of model blocks that, when executed, simulate behavior of corresponding physical elements of the dynamic system, and
      the obtaining being performed by a device;
   determining performance information based on the data,
      the performance information being associated with the plurality of model blocks included in the block diagram model,
      the performance information including one or more of:
         a total quantity of executions associated with each of the plurality of model blocks,
         information associated with transferring data between two or more of the plurality of model blocks, or
         information determined based on identifying a causal relationship associated with executing the block diagram model, and
      the determining the performance information being performed by the device;
   determining particular performance information, of the performance information, that identifies execution information associated with a particular model block of the plurality of model blocks included in the block diagram model,
      the determining the particular performance information being performed by the device;
   producing a graphical interface based on the particular performance information, the graphical interface including a heat map,
      the heat map conveying the particular performance information based on a scale,
         the scale relating the particular performance information to performance information associated with another model block of the plurality of model blocks,
      the graphical interface being interactive, and
      the producing being performed by the device; and
   providing the graphical interface for display,
      the providing the graphical interface for display being performed by the device.

16. The method of claim 15, where the graphical interface includes visual information reflecting the execution information associated with the particular model block.

17. The method of claim 15, where the performance information is associated with at least one of:
   an amount of global memory usage;
   a traversed sample delay;
   a zero crossing;
   an algebraic loop iteration;
   a solver reset;
   an amount of design stack memory usage; or
   an amount of logging memory usage.

18. The method of claim 15, further comprising:
   determining performance information that identifies an occurrence of an event associated with executing the block diagram model; and
   producing the graphical interface based on the performance information that identifies the occurrence of the event associated with executing the block diagram model,
      the graphical interface including visual information reflecting the occurrence of the event associated with executing the block diagram model.

19. The method of claim 15, further comprising:
   receiving information that identifies a first user selected region,
      the first user selected region including a first set of model blocks of the plurality of model blocks;
   receiving information that identifies a second user selected region,
      the second user selected region including a second set of model blocks of the plurality of model blocks, and
      the second user selected region being different than the first user selected region;
   producing a first graphical interface based on performance information associated with the first user selected region;
   producing a second graphical interface based on performance information associated with the second user selected region; and
   determining, based on the first graphical interface and the second graphical interface, that processing of information, associated with the first user selected region, is to be performed by a parallel processor,
      the parallel processor operating in parallel with a processor that processes information associated with the second user selected region.

20. The method of claim 15, where the graphical interface is:
　a first graphical interface associated with the plurality of model blocks included in the block diagram model; and
　where the method further comprises:
　　receiving user input, associated with the first graphical interface, identifying a model block of the plurality of model blocks included in the first graphical interface;
　　determining performance information associated with the model block;
　　producing, based on the performance information associated with the model block, a second graphical interface,
　　　the second graphical interface including visual information reflecting the performance information associated with the model block; and
　　causing the second graphical interface to be displayed.

21. A non-transitory computer-readable medium storing instructions, the instructions comprising:
　one or more instructions that, when executed by one or more processors, cause the one or more processors to:
　　generate program code associated with a block diagram model,
　　　the block diagram model, when executed, simulating a dynamic system,
　　　the block diagram model including a plurality of model elements that, when executed, simulate behavior of corresponding physical elements of the dynamic system,
　　　the block diagram model being based on an analysis of a heat map associated with the block diagram model,
　　　　the heat map being created based on performance information associated with the plurality of model elements included in the block diagram model,
　　　　the performance information including one or more of:
　　　　　a total quantity of executions associated with each of the model elements,
　　　　　information associated with transferring data between two or more of the plurality of model elements, or
　　　　　information determined based on identifying a causal relationship associated with executing the block diagram model,
　　　　the performance information identifying execution information associated with the plurality of model elements included in the block diagram model, and
　　　　the heat map including a visual representation, associated with the block diagram model, that indicates the performance information, identifying the execution information associated with the plurality of model elements, relative to a heat map scale; and
　　cause the generated program code to be executed to simulate operation of the dynamic system associated with the block diagram model.

22. The device of claim 1, where the one or more processors are further to:
　superimpose the heat map onto the plurality of model elements of the block diagram model; and
　provide, for display, the heat map superimposed onto the plurality of model elements.

23. The device of claim 1, where the one or more processors are further to:
　generate the heat map based on a first time period associated with the execution of the block diagram model; and
　generate an updated heat map based on a second time period associated with the execution of the block diagram model,
　　the first time period being different than the second time period.

* * * * *